(12) United States Patent
Raymond et al.

(10) Patent No.: US 10,015,981 B2
(45) Date of Patent: Jul. 10, 2018

(54) INDUSTRIAL BATTER AND BREADING MACHINE

(71) Applicants: Jeff Raymond, Bellevue, OH (US); Alan Strause, Castalia, OH (US)

(72) Inventors: Jeff Raymond, Bellevue, OH (US); Alan Strause, Castalia, OH (US)

(*) Notice: Subject to any disclaimer, the term of this patent is extended or adjusted under 35 U.S.C. 154(b) by 257 days.

(21) Appl. No.: 13/766,361

(22) Filed: Feb. 13, 2013

(65) Prior Publication Data
US 2013/0247780 A1   Sep. 26, 2013

Related U.S. Application Data

(60) Provisional application No. 61/597,941, filed on Feb. 13, 2012.

(51) Int. Cl.
*A23B 4/02* (2006.01)
*A23L 3/00* (2006.01)
*A23L 3/18* (2006.01)
*A21D 13/00* (2017.01)
*A21D 2/16* (2006.01)
*A23P 1/08* (2006.01)
*A23P 20/12* (2016.01)

(52) U.S. Cl.
CPC ............... *A23P 1/082* (2013.01); *A23P 20/12* (2016.08)

(58) Field of Classification Search
CPC ............ A23N 4/085; A23B 4/32; A23P 1/082
USPC ......... 99/494, 452, 458, 459, 460, 461, 465, 99/467, 471, 477, 485, 488, 489, 514
See application file for complete search history.

(56) References Cited

U.S. PATENT DOCUMENTS

| | | | | |
|---|---|---|---|---|
| 1,587,687 A * | 6/1926 | Vicars | ............... | A21C 11/10 225/100 |
| 3,534,787 A * | 10/1970 | Friedrich | ............... | B05C 19/04 118/308 |
| 3,703,382 A * | 11/1972 | Harkey | ............... | A23P 1/082 118/16 |
| 3,738,313 A * | 6/1973 | Heim | ............... | 118/16 |
| 3,759,218 A * | 9/1973 | Korstvedt | ............... | A23P 1/082 118/18 |
| 3,885,519 A * | 5/1975 | Orlowski | ............... | 118/16 |
| 3,967,583 A * | 7/1976 | Booth | ............... | A21C 9/04 118/16 |
| 4,016,299 A * | 4/1977 | Booth | ............... | 426/293 |
| 4,496,084 A * | 1/1985 | Booth | ............... | A23P 1/082 118/17 |
| 5,073,393 A * | 12/1991 | Defrancisci | ............... | A23L 1/0121 426/302 |
| 5,924,356 A * | 7/1999 | Harper et al. | ............... | 99/494 |
| 5,937,744 A * | 8/1999 | Nothum et al. | ............... | 99/494 |
| 6,244,170 B1 * | 6/2001 | Whited et al. | ............... | 99/494 |
| 6,478,138 B1 * | 11/2002 | Edwards | ............... | B65G 17/345 198/370.06 |
| 2005/0000842 A1 * | 1/2005 | Timmerman | ............... | B26D 5/32 206/449 |

(Continued)

*Primary Examiner* — David Angwin
*Assistant Examiner* — Gyounghyun Bae
(74) *Attorney, Agent, or Firm* — Cooper Legal Group, LLC (57) ABSTRACT

An apparatus applies a food coating to a food product. The apparatus includes a hopper for storing the food coating and a food coating applicator for applying the food coating from the hopper onto the food product. The apparatus also includes a basin for catching unused food coating and a return conveyor for moving unused food coating from the basin to the breading hopper.

20 Claims, 9 Drawing Sheets

(56) References Cited

U.S. PATENT DOCUMENTS

| | | | |
|---|---|---|---|
| 2006/0032384 A1* | 2/2006 | Muniga et al. | 99/494 |
| 2007/0186847 A1* | 8/2007 | Stacy et al. | 118/24 |
| 2007/0264397 A1* | 11/2007 | Mather | A23L 1/005 426/295 |
| 2008/0014310 A1* | 1/2008 | Dargusch | A23P 20/12 426/295 |
| 2008/0187630 A1* | 8/2008 | Vimini et al. | 426/96 |
| 2008/0283366 A1* | 11/2008 | Karpinsky et al. | 198/763 |
| 2010/0043651 A1* | 2/2010 | Mather | A23L 1/005 99/494 |

* cited by examiner

INDUSTRIAL BATTER AND BREADING MACHINE

RELATED APPLICATIONS

This application claims priority from U.S. Provisional Application Ser. No. 61/597,941, filed 13 Feb. 2012, which is incorporated herein by reference in its entirety.

FIELD OF THE INVENTION

The invention relates to an apparatus for applying a food coating to a food product. In one aspect, the invention relates to an industrial machine for applying batter and breading to a food product. More particularly, the invention relates to an industrial batter and breading machine that does not require a traditional system of one or more screw/auger feeders for distributing breading material.

BACKGROUND OF THE INVENTION

Conventional industrial breading machines utilize one or more screw or auger type feeders to move breading material throughout the machine, such as from a hopper to an application section of the machine, or from a recovery reservoir back to the hopper. The traditional auger feeders can suffer from drawbacks in that they can damage the breading material, are prone to clogging, are difficult to clean and maintain, and are dangerous to operators.

SUMMARY OF THE INVENTION

The invention relates to an industrial batter and breading machine that utilizes a system of conveyors to replace conventional auger fed breading delivery systems.

The invention also relates to an apparatus for applying a food coating to a food product. The apparatus includes a hopper for storing the food coating and a food coating applicator for applying the food coating from the hopper onto the food product. The apparatus also includes a basin for catching unused food coating and a return conveyor for moving unused food coating from the basin to the breading hopper.

The invention also relates to an apparatus for applying breading to a food product. The apparatus includes a battering section including a batter applicator and a battering conveyor for moving the product through the batter applicator. The apparatus also includes a breading section including a breading hopper, a breading applicator for applying the breading from the hopper, and a breading conveyor for moving the product through the breading applicator. The apparatus further includes a breading return conveyor that moves unused breading from a breading basin back to the breading hopper.

The invention also relates to an apparatus for applying a food coating to a food product. The apparatus includes a return conveyor for moving the food coating from a basin to a hopper. The return conveyor includes a plurality of grates along its length. The apparatus also includes a return channel through which the return conveyor moves. The return channel includes spaced walls between which the return conveyor extends. The walls are adapted to confine the breading in the grates which permits the return conveyor to move the breading through the channel.

The invention further relates to an apparatus for applying batter and breading to a food product. The apparatus includes a battering section including a batter applicator and a battering conveyor for moving the product through the batter applicator. A breading section includes a breading hopper, a breading applicator for applying the breading from the hopper, and a breading conveyor for moving the product through the batter applicator. A breading return conveyor moves unused breading from a breading basin to the breading hopper.

According to one aspect, the return conveyor runs transverse to a direction of travel. The return conveyor may include a first segment that runs along a bottom of the breading catch basin, a second segment that runs through a breading return channel from the catch basin to the breading hopper, and a third segment that exits the return channel and spans over an opening in the breading hopper.

According to another aspect, the return channel includes spaced channel members along which the return belt travels. The channel members may have a curved and concentric configuration. The breading return conveyor may travel vertically along a surface which allows the grated structure of the belt to collect and carry the breading which would otherwise fall through the grates.

DESCRIPTION

The invention relates to an apparatus for applying a food coating to a food product. More particularly, the invention relates to an apparatus that applies batter and breading to a food product (hereafter "product"). FIGS. 1-7 illustrate an embodiment of an apparatus 10 for applying batter and breading to a product.

Referring to the figures, the apparatus 10 includes a batter section 12 in which batter is applied to the product. A breading section 14 of the apparatus 10 applies breading (e.g., flour, breadcrumbs, etc.) to the product. The apparatus 10 includes conveyor belts for moving the product through the batter section 12 and breading section 14. The conveyor belts may, for example, be conventional metal grate belts. The belts can be operated via electric motors and/or hydraulic drive units.

Figure 1:
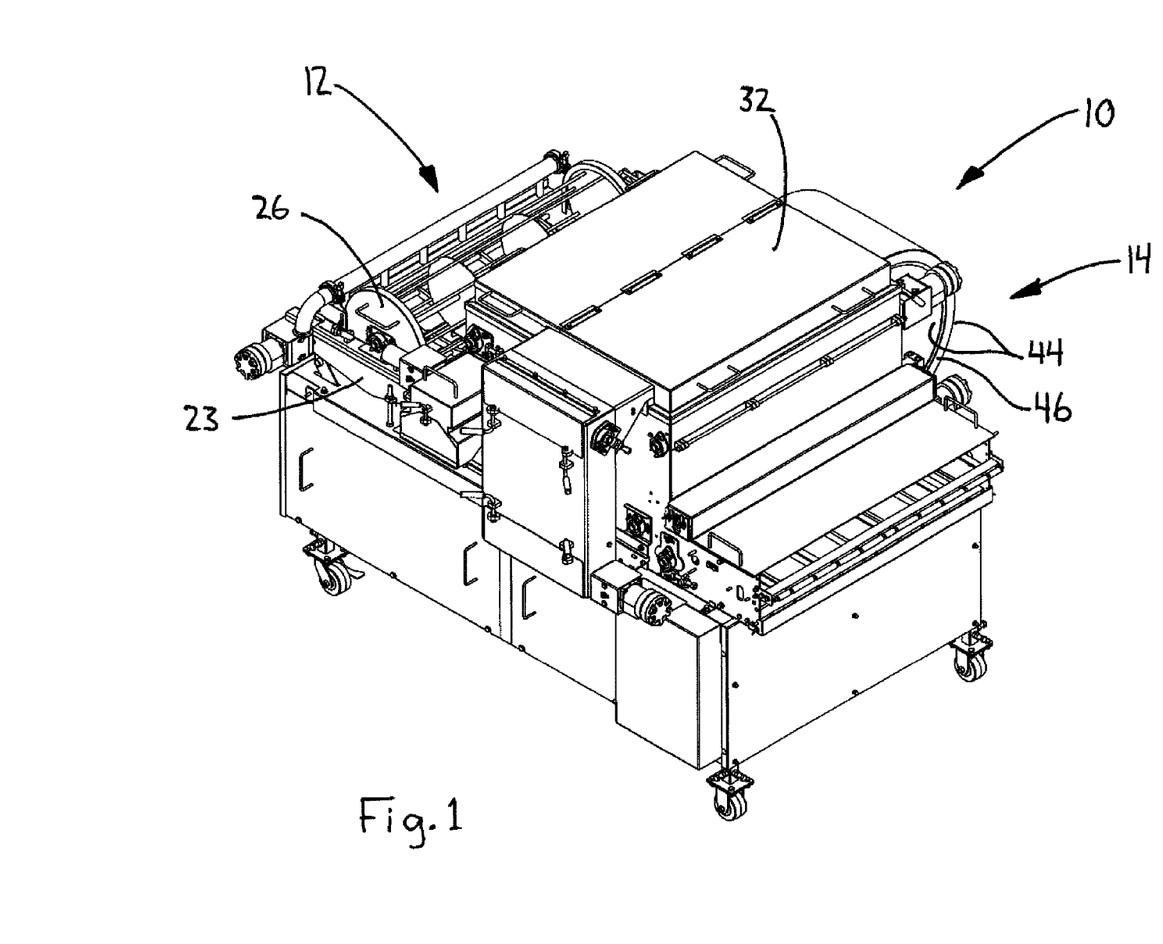
FIGS. 1-3 are perspective views of an apparatus for applying a food coating to a food product, according to the invention.
Figure 2:
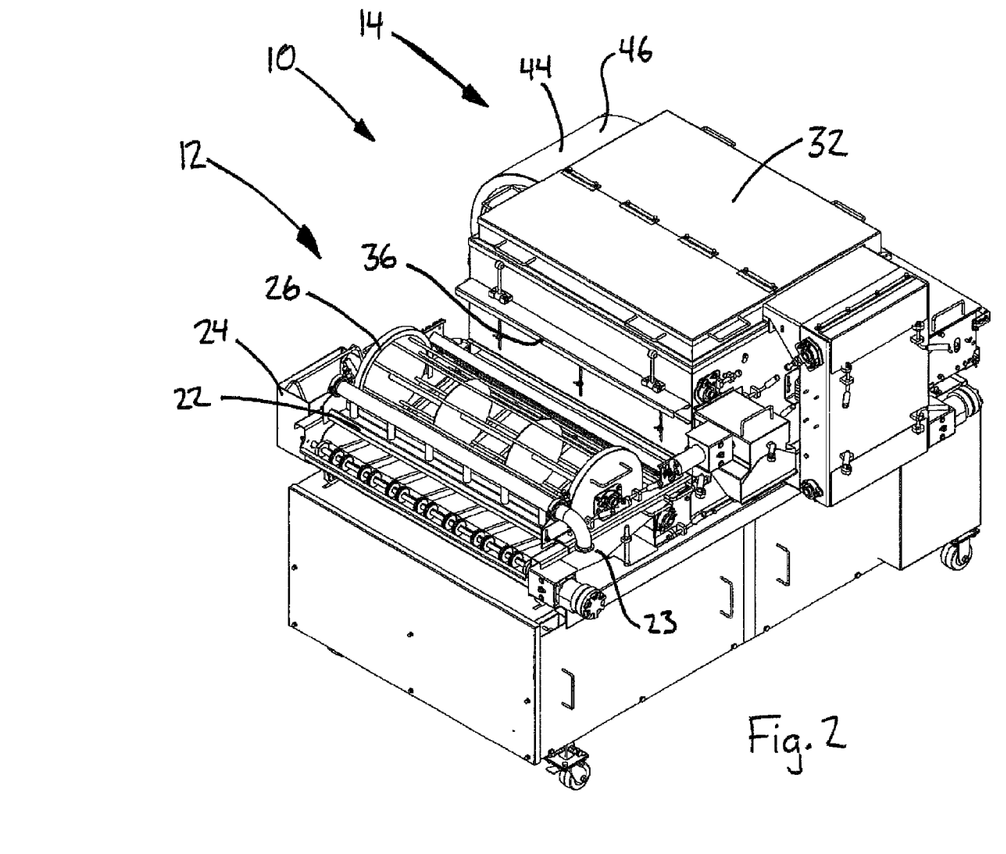
Figure 3:
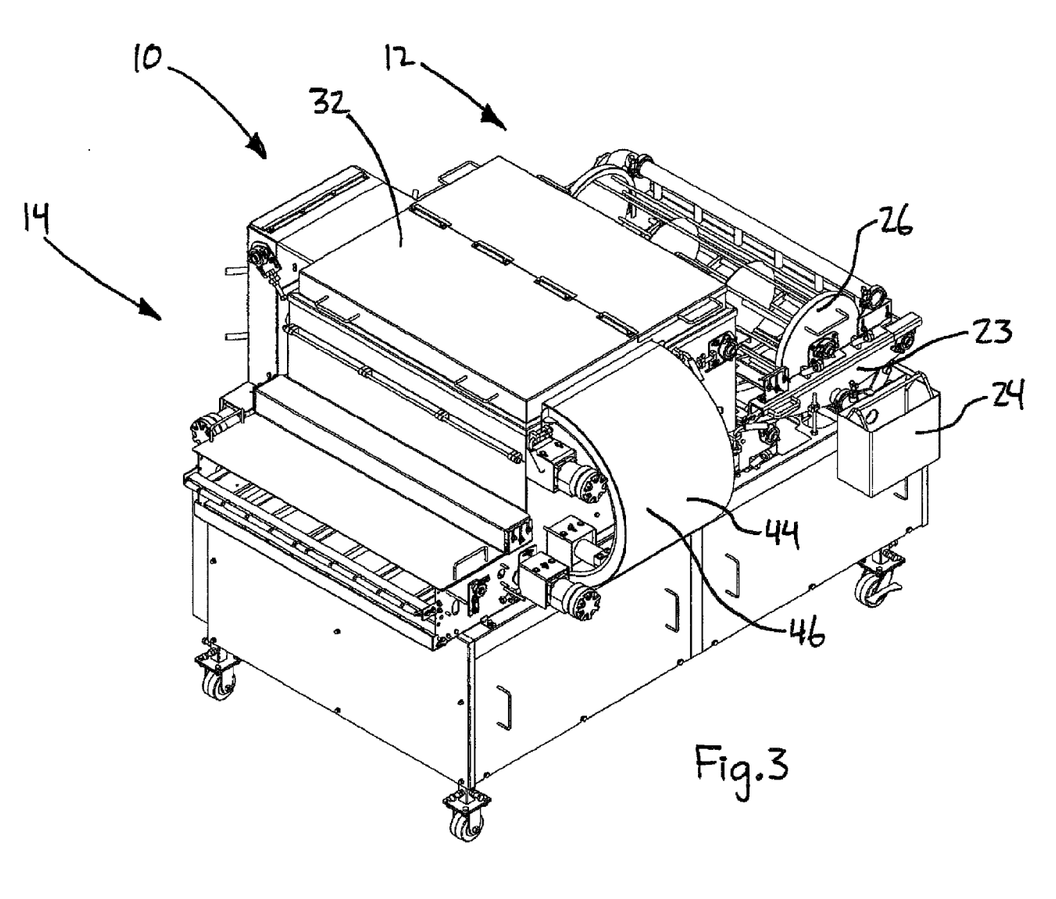
Figure 4:
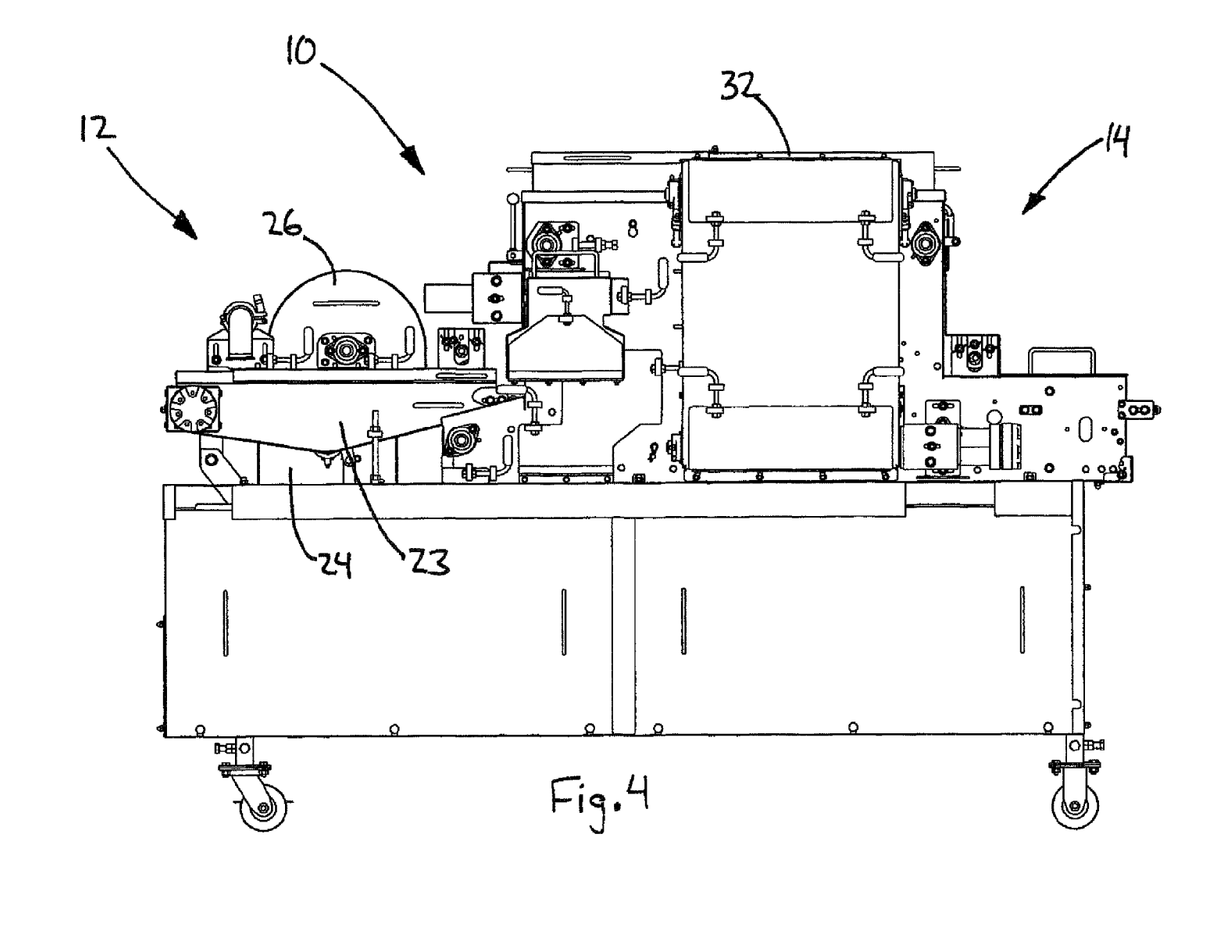
FIG. 4 is a side elevation view of the apparatus.
Figure 5:
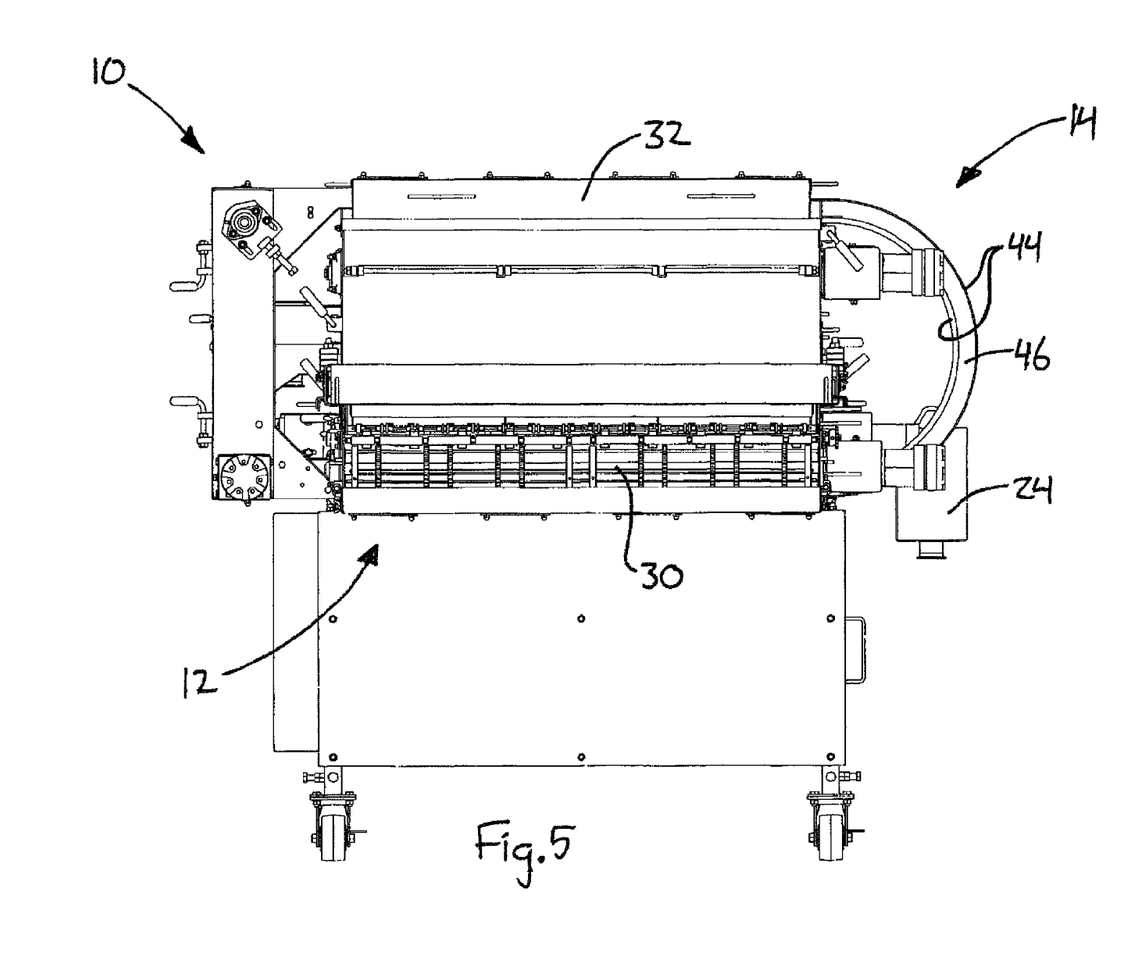
FIG. 5 is an end elevation view of the apparatus.
Figure 6:
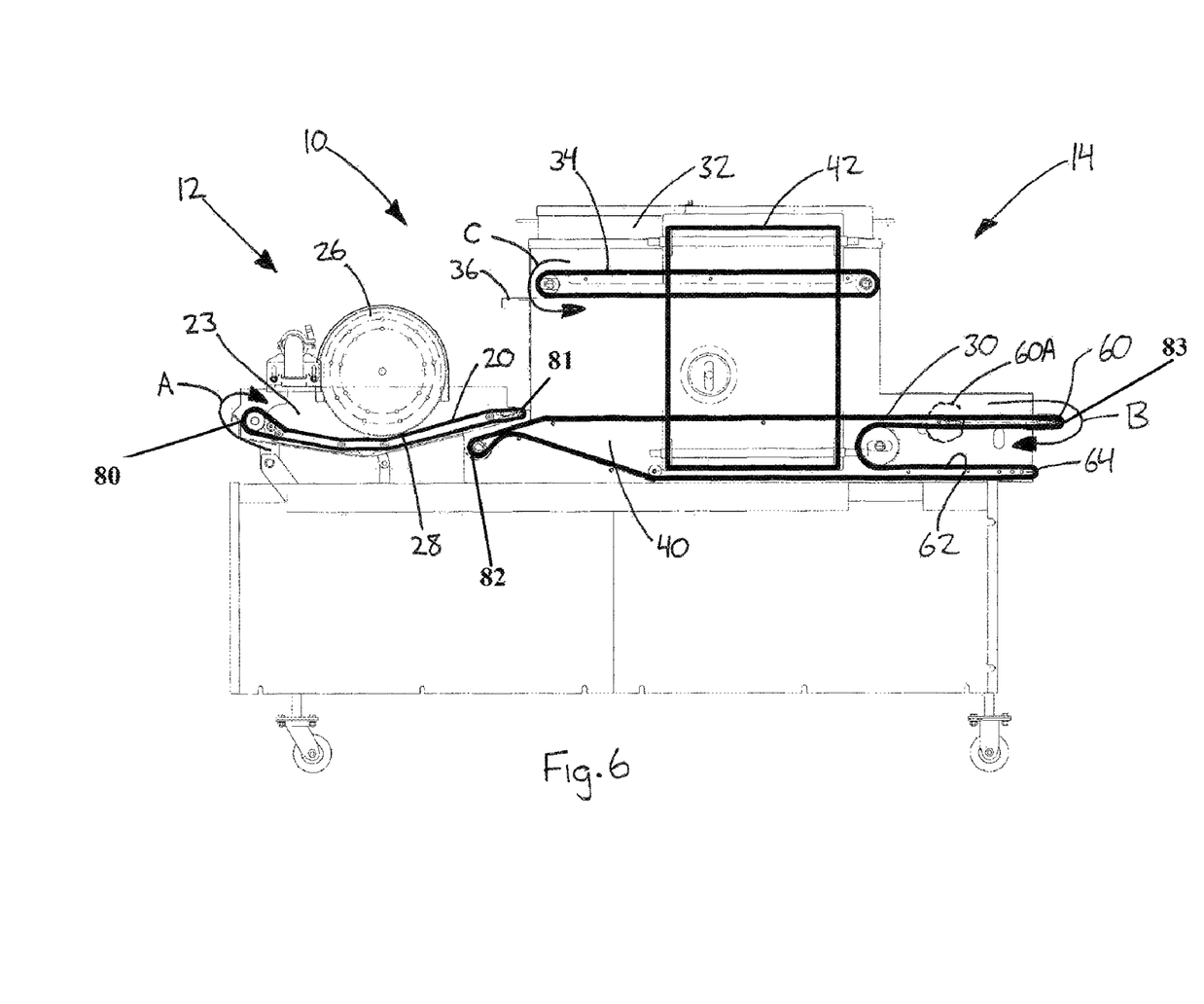
FIG. 6 is a side elevation view of the apparatus.

The details of the battering section 12 are described in reference to FIG. 6. Those skilled in the art will appreciate that other figures in this description also show certain aspects of the battering section 12. The batter section 12 includes a battering belt 20 that moves the product in the direction of travel indicated generally by arrow A in FIG. 2. The battering belt 20 extends between a first battering end 80 and a second battering end 81. The battering belt 20 supports the food product and moves the food product from the first battering end 80 to the second battering end 81 of the batter section 12. The battering belt 20 thus moves in a clockwise direction as viewed in FIG. 6.

The batter section 12 also includes a batter applicator which, for example, may be in the form of a batter overflow pan 22 into which batter is supplied. The batter overflows from the pan 22 (see FIG. 2) to create a waterfall curtain of batter that flows onto the battering belt 20. The batter curtain spans the width or a substantial portion of the width of the battering belt 20. The batter flows onto the battering belt 20, passes through the openings in the belt grates, and collects in a battering belt/submerger pan 23. The battering belt/submerger pan 23 has holes that allow the batter to drain into a batter reservoir 24 (see, e.g., FIGS. 2-4). A pump recirculates the batter from the reservoir 24 into the batter overflow pan 22, where it flows again in the batter curtain onto the belt 20.

The battering section 12 also includes a wheel submerger 26 that is positioned above the battering belt 20 and the batter reservoir 24. The wheel submerger 26 depresses a section 28 of the battering belt into the batter submerger pan 23. The wheel submerger 26 may submerge the section of the battering belt 20 in the batter in the submerger pan 23.

Figure 7:
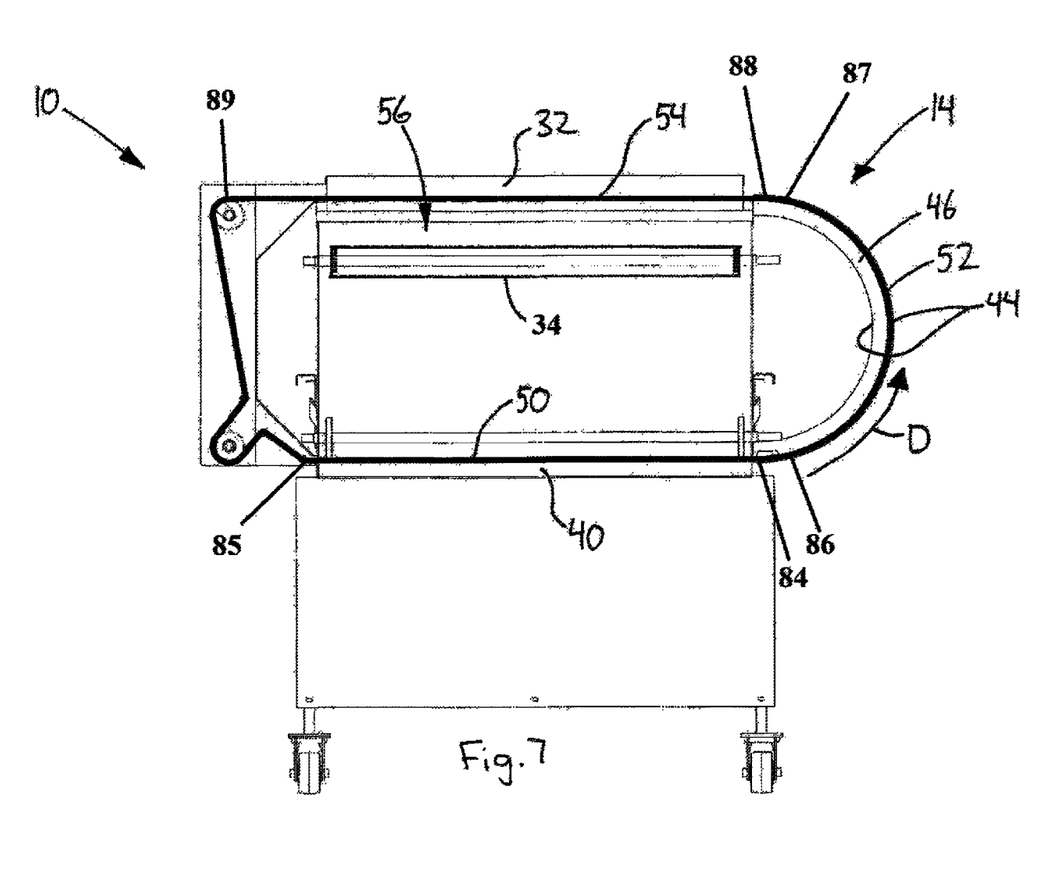
FIG. 7 is an end elevation view of the apparatus.

The breading section 14 is described in reference to FIGS. 6 and 7. Those skilled in the art will appreciate that other figures in this description also show certain aspects of the breading section 14. The breading section 14 includes a breading conveyor belt 30 that moves the product in the direction of travel indicated generally by arrow B in FIG. 6. The breading conveyor belt 30 extends between a first breading end 82 and a second breading end 83. The breading conveyor belt 30 receives the food product from the second battering end 81 of the battering belt 20 at the first breading end 82. The breading conveyor belt 30 supports the food product and moves the food product from the first breading end 82 to the second breading end 83.

The breading section 14 also includes a breading hopper 32 that holds a supply of breading material. The breading in the hopper 32 is exposed to a breading hopper conveyor belt 34. The hopper belt 34 moves in a counterclockwise direction as viewed in FIG. 6, as indicated generally by arrow C, and moves the breading in the hopper breading flow direction toward a breading applicator which, for example, may comprise a slide gate 36. The breading passes through the slide gate 36, forming a breading curtain that drops onto the breading belt 30.

Figure 8:
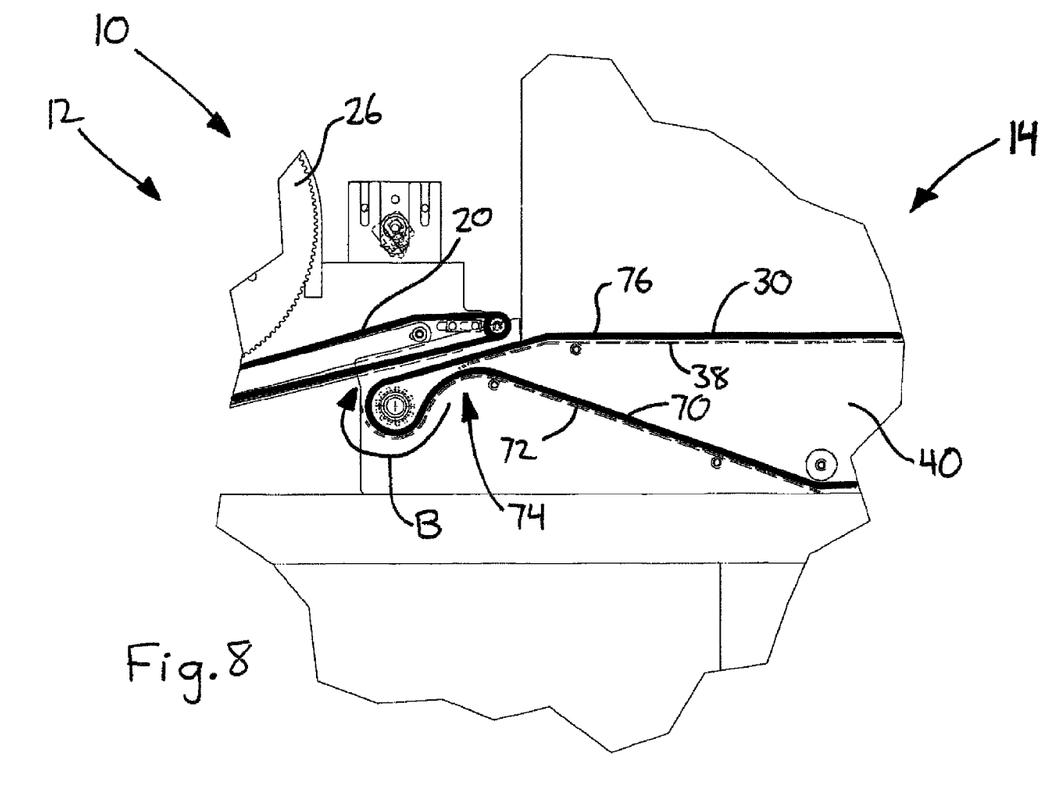
FIG. 8 is a magnified view of a portion of the apparatus.

The breading curtain spans the width or a substantial portion of the width of the breading belt 30. The breading drops onto the breading belt 30, which rides on a sheet surface 38 (see FIG. 8), so the breading material collects on the belt and moves with the belt. Additionally, as best shown in FIG. 8, a bottom section 70 of the breading belt 30 rides along a bottom surface 72 of the basin 40 and carries breading with it along an inclined surface. When the breading reaches a transition area 74 at the top of the inclined surface 72, the breading is transferred to an upper portion 76 of the breading belt 30, which rides on the surface 38. This helps maintain a sufficient and even layer of breading on the breading belt 30 so as to ensure that the bottom surface of the product is breaded completely. At a certain point downstream of the breading curtain, the surface 38 ends and the breading passes through the openings in the grates of the breading belt 30 and collects in the breading catch basin 40.

According to the invention, the breading section 14 includes a breading return conveyor belt 42 that moves the breading collected in the catch basin 40 back into the breading hopper 32 so that the breading again be circulated onto the breading belt 30 via the breading curtain. Referring to FIG. 7, the breading return belt 42 runs transverse to the direction of product travel and the direction of travel of the battering belt 20 and breading belt 30. The direction of travel of the breading return belt 42 is counter clockwise as viewed in FIG. 7 and as indicated generally by arrow D.

The breading return belt 42 runs along a generally D-shaped path. The breading return belt 42 has a first segment 50 that runs along a bottom of the breading catch basin 40. The first segment 50 extends between a first first segment end 84 and a second first segment end 85. A second segment 52 runs through a curved breading return channel 46 defined by spaced, curved, concentric channel members 44 formed, for example, from sheet metal. The second segment 52 extends between a first second segment end 86 and a second second segment end 87. A third segment 54 exits the return channel 46 and spans over an opening 56 in the hopper 32. The third segment 54 extends between a first third segment end 88 and a second third segment end 89. The third segment 54 is substantially parallel to the first segment 50. The first second segment end 86 of the second segment 52 is coupled to the first first segment end 84 of the first segment 50. The second second segment end 87 of the second segment 52 is coupled to the first third segment end 88 of the third segment 54. The second segment 52 extends circumferentially about an axis that is substantially equidistant from the first first segment end 84 of the first segment 50 and the first third segment end 88 of the third segment 54.

Referring to FIG. 6, in operation, the product is placed on the battering belt 20 and begins to travel in the product direction of travel, from left to right as viewed in FIG. 6. The product passes through the batter curtain flowing from the batter overflow pan 22 (see FIG. 2). The batter coats the top of the product. The product continues and reaches the wheel submerger 26, which forces the product on the belt section 28 below the surface of the batter in the batter submerger pan 23. The batter coats the bottom of the product.

The product continues in the product direction of travel and is transferred onto the breading belt 30. The product passes through the breading curtain beneath the slide gate 36, where the top (and sides) of the product are coated with breading, which sticks due to the batter coating the product. At the same time, breading collected by the grated structure of the belt 30 riding on the surface 38 sticks to the battered bottom surface of the product. Thus, both sides of the product are coated with breading.

The product continues through the breading section 14, where the battered and breaded product is removed at belt turn 60. This may be desirable for food products that are too sensitive for flipping. Alternatively, the belt turn can be moved to the left as viewed in FIG. 6 to the area indicated generally at 60A, so that it flips onto lower belt section 62 and continues for removal at belt turn 64. This flipping of the food product can knock off excess breading, which falls into the basin 40. This feature carries the advantage of potentially eliminating the need for blow-off tubes for removing excess breading.

As the product is battered and breaded by the apparatus 10, the batter is recycled from the reservoir 24 to the overflow pan 22 and the breading is recycled from the basin 40 to the hopper 32. Referring to FIG. 7, the breading return belt 42 travels in the counterclockwise direction of travel. The first segment 50, running along the bottom of the catch basin 40, collects breading in its grated structure. As the breading return belt 42 continues, it enters the return channel 46, where the fit between the second segment 52 and the channel members 44 continues to maintain the breading collected in the grated structure of the breading return belt. The grates, in combination with the channel members 44, create a confinement in which the breading is trapped as it moves through the return channel 46.

The breading passes through the curved path of the return channel 46 and exits, where the third segment 54 carries the breading to the opening 56. When the breading reaches the opening, it is no longer supported by the sheet material (e.g., sheet metal) surface of the basin 40 bottom or return channel 46. The breading drops through the grated structure of the breading return belt 42 into the hopper, where it can then be re-circulated to the breading curtain by the hopper belt 34.

Figure 9:
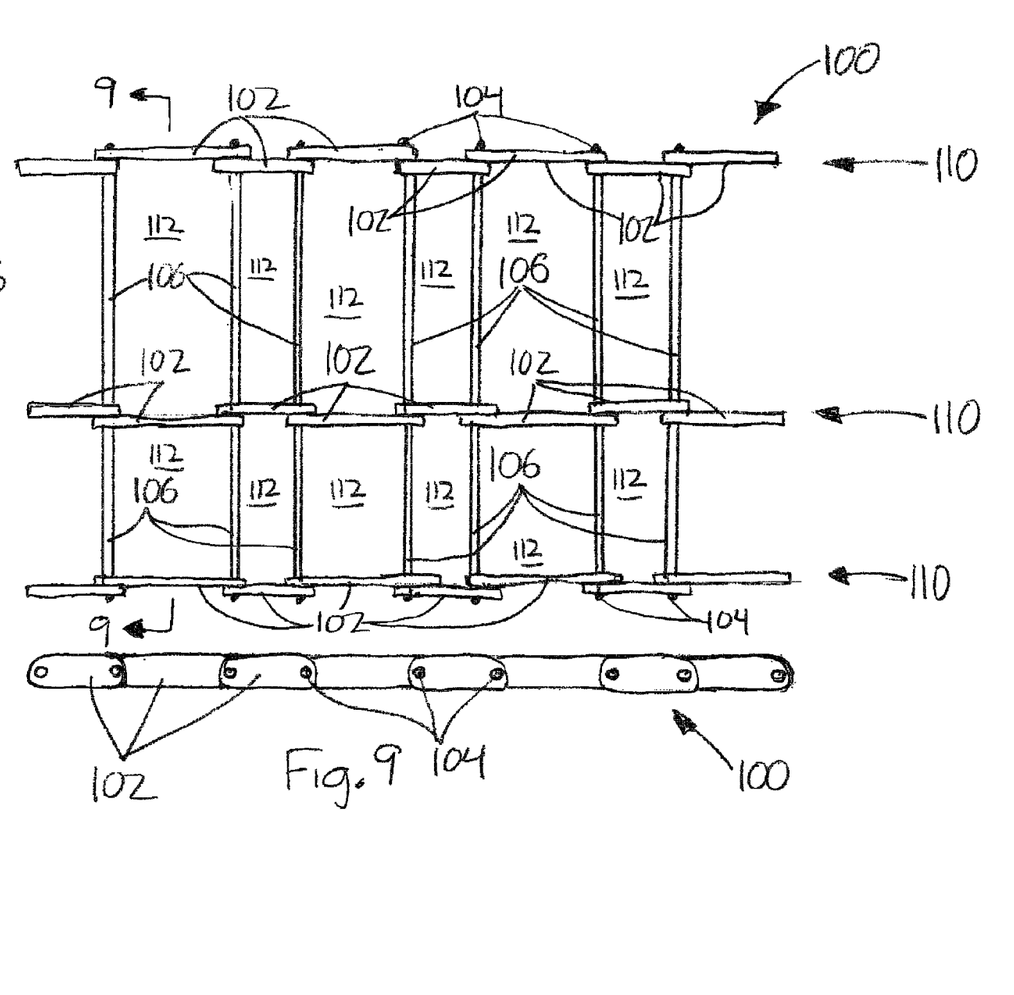
FIG. 9 is a schematic view of a portion of the apparatus.

FIG. 9 illustrates a section of a belt 100 that can be representative of any of the battering belt 20, breading conveyor belt 30, breading hopper conveyor belt 34, and breading return belt 42. The belt 100 includes a plurality of links 102 that are pivotally joined at pivot points 104 by portions of spans 106 that extend between corresponding links. The pivotally connected links 102 form chains 110 with the spans 106 spanning between the chains 110. As shown in FIG. 9, the spaces bounded by the links 102 and spans 106 define confines 112 in which the breading material is maintained when the breading conveyor belt 30, breading hopper conveyor belt 34, and breading return belt 42 move the material. For example, it is the confines 112 defined by the links 102 and spans 106 of the breading return belt 42 in which the breading material is confined as it is moved along the return channel 46 from the basin 40 to the hopper 32.

Those skilled in the art will appreciate that the combination of the breading return belt 42 and the return channel 46 facilitate vertical movement of the breading from the basin 40 to the hopper 32. The breading return belt 42, travelling along the surfaces of the basin 40 and the return channel 46, allows the grated structure of the belt to carry the breading which would otherwise fall through the openings in the grate. The breading return belt 42, in combination with the return channel 46, can thus advantageously move the breading vertically from the catch basin 40 to the hopper 32.

The apparatus 10 is thus advantageous in several aspects. The apparatus 10 saves valuable floor space versus two independent machines (one for battering and one for breading). The apparatus 10 can have a comparatively short length, regardless of belt width. The apparatus 10 eliminates the use of augers to move the breading, and thus will not jam, is safe to operate, easy to clean, does not degrade the breading material. The apparatus 10 can incorporate a flip discharge, which can eliminate blow off tubes. Alternatively, the apparatus 10 can be configured for a straight non-flip discharge. The apparatus 10 allows a single operator to run a single machine that performs a battering and breading function that in the past required two machines. The batter reservoir of the apparatus 10 serves the dual function of overflow and submerge simultaneously. The apparatus 10 can incorporate electric or hydraulic drives. The apparatus 10 is capable of running in a small volume mode requiring as little as 20 pounds of breading on 14-inch main belt width machine.

From the above description of the invention, those skilled in the art will perceive improvements, changes and modifications. For example, while the illustrated embodiment is directed to a combination battering and breading machine, those skilled in the art will appreciate that the conveyor breading return conveyor could be applied to a machine that applies breading only. Such improvements, changes and modifications within the skill of the art are intended to be covered by the appended claims.

We claim:

1. An apparatus for applying breading to a food product, the apparatus comprising:
    a breading hopper storing a breading;
    a breading hopper conveyor belt moving the breading from the breading hopper, the breading hopper conveyor belt extending between a first breading hopper conveyor belt end of the breading hopper conveyor belt and a second breading hopper conveyor belt end of the breading hopper conveyor belt, the breading hopper conveyor belt supporting the breading and moving the breading from the second breading hopper conveyor belt end of the breading hopper conveyor belt to the first breading hopper conveyor belt end of the breading hopper conveyor belt;
    a breading conveyor belt disposed below the breading hopper conveyor belt, the breading conveyor belt extending between a first breading conveyor belt end of the breading conveyor belt and a second breading conveyor belt end of the breading conveyor belt, the breading conveyor belt supporting a food product and moving the food product along a first plane from the first breading conveyor belt end of the breading conveyor belt to the second breading conveyor belt end of the breading conveyor belt;
    a breading applicator disposed above the breading conveyor belt, the breading applicator applying the breading from the breading hopper conveyor belt onto the food product that is supported on the breading conveyor belt to apply the breading to the food product;
    a basin that catches an unused portion of the breading; and
    a breading return conveyor belt that moves the unused portion of the breading from the basin to the breading hopper, wherein the breading return conveyor belt rotates within a second plane that is substantially perpendicular to the first plane along which the food product is moved by the breading conveyor belt, the breading return conveyor belt positioned at least one of between the first breading hopper conveyor belt end of the breading hopper conveyor belt and the second breading hopper conveyor belt end of the breading hopper conveyor belt or between the first breading conveyor belt end of the breading conveyor belt and the second breading conveyor belt end of the breading conveyor belt.

2. The apparatus recited in claim 1, wherein the breading applicator applies the breading on top of the food product and the basin catches the unused portion of the breading beneath the food product.

3. The apparatus recited in claim 2, wherein the breading hopper is positioned above the breading conveyor belt and the breading applicator.

4. The apparatus recited in claim 1, wherein the breading return conveyor belt defines a hollow interior within which a hopper portion of the breading hopper conveyor belt and a belt portion of the breading conveyor belt are disposed.

5. The apparatus recited in claim 1, comprising a batter applicator and a battering conveyor belt that moves the food product with respect to the batter applicator to apply batter to the food product, wherein the breading applicator applies the breading onto the food product after the batter is applied to the food product.

6. The apparatus recited in claim 1, wherein the breading return conveyor belt comprises a first segment that extends along a bottom surface of the basin, a second segment that extends through a return channel from the basin to the breading hopper, and a third segment that exits the return channel and extends over an opening in the breading hopper.

7. The apparatus recited in claim 6, wherein the second segment of the breading return conveyor belt is positioned between spaced walls that define the return channel.

8. The apparatus recited in claim 6, wherein the breading return conveyor belt comprises a fourth segment that extends between the first segment and the third segment from the breading hopper to the basin, the fourth segment asymmetric with respect to the second segment.

9. The apparatus recited in claim 6, wherein the breading return conveyor belt comprises a fourth segment that extends a fourth length between the first segment and the third segment from the breading hopper to the basin, the fourth length different than a second length of the second segment that extends between the first segment and the third segment from the breading hopper to the basin.

10. The apparatus recited in claim 1, wherein the breading return conveyor belt comprises a plurality of grates along a length of the breading return conveyor belt, the breading return conveyor belt collecting the unused portion of the breading between the grates.

11. The apparatus recited in claim 1, wherein the breading return conveyor belt rotates about an axis that is substantially parallel to the first plane along which the food product is moved by the breading conveyor belt.

12. An apparatus for applying breading to a food product, the apparatus comprising:
    a battering section comprising a battering conveyor belt extending between a first battering conveyor belt end of the battering conveyor belt and a second battering conveyor belt end of the battering conveyor belt, the battering conveyor belt supporting a food product and moving the food product from the first battering conveyor belt end of the battering conveyor belt to the second battering conveyor belt end of the battering conveyor belt through batter of the battering section; and
    a breading section comprising:
      a breading hopper storing a breading:
      a breading hopper conveyor belt extending between a first breading hopper conveyor belt end of the breading hopper conveyor belt and a second breading hopper conveyor belt end of the breading hopper conveyor belt, the breading hopper conveyor belt moving the breading along a third plane from the breading hopper;
      a breading applicator for applying the breading from the breading hopper;
      a breading conveyor belt extending between a first breading conveyor belt end of the breading conveyor belt and a second breading conveyor belt end of the breading conveyor belt, the breading conveyor belt receiving the food product from the second battering conveyor belt end of the battering conveyor belt at the first breading conveyor belt end of the breading conveyor belt, the breading conveyor belt supporting the food product and moving the food product along a first plane from the first breading conveyor belt end of the breading conveyor belt to the second breading conveyor belt end of the breading conveyor belt, wherein the second battering conveyor belt end of the battering conveyor belt is substantially co-planar with the first breading conveyor belt end of the breading conveyor belt, the breading applicator applying the breading from the breading hopper conveyor belt onto the food product that is supported on the breading conveyor belt;
      a basin that catches an unused portion of the breading; and
      a breading return conveyor belt that moves the unused portion of the breading from the basin to the breading hopper, wherein the breading return conveyor belt rotates within a second plane that is substantially perpendicular to the first plane along which the food product is moved by the breading conveyor belt and the third plane along which the breading is moved by the breading hopper conveyor belt.

13. The apparatus recited in claim 12, wherein the breading return conveyor belt rotates about an axis that is substantially parallel to the first plane along which the food product is moved by the breading conveyor belt.

14. The apparatus recited in claim 13, wherein the breading return conveyor belt comprises a first segment that extends along a bottom surface of the basin, a second segment that extends through a return channel from the basin to the breading hopper, and a third segment that exits the return channel and extends over an opening in the breading hopper.

15. The apparatus recited in claim 14, wherein the second segment of the breading return conveyor belt is positioned between spaced walls that define the return channel.

16. The apparatus recited in claim 14, wherein the first segment lies with the first plane that is substantially parallel to the second plane within which the second segment lies.

17. The apparatus recited in claim 13, wherein the breading return conveyor belt comprises a plurality of grates along a length of the breading return conveyor belt, the breading return conveyor belt collecting the unused portion of the breading between the grates.

18. The apparatus recited in claim 13, wherein the breading return conveyor belt defines a hollow interior within which a belt portion of the breading conveyor belt is disposed.

19. An apparatus comprising:
    a breading return conveyor belt that moves an unused portion of a breading from a basin to a breading hopper after the breading is applied to a food product supported on a breading conveyor belt of the apparatus, the breading return conveyor belt comprising:
      a first segment extending between a first first segment end of the first segment and a second first segment end of the first segment, the first segment disposed between a bottom section of the breading conveyor belt and an upper portion of the breading conveyor belt;
      a second segment extending between a first second segment end of the second segment and a second second segment end of the second segment; and
      a third segment extending between a first third segment end of the third segment and a second third segment end of the third segment, the third segment disposed on an opposite side of the first segment and substantially perpendicular to the breading conveyor belt,
      wherein the third segment is substantially parallel to the first segment,
      wherein the first second segment end of the second segment is coupled to the first first segment end of the first segment and the second second segment end of the second segment is coupled to the first third segment end of the third segment, and
      wherein the second segment extends circumferentially about an axis that is substantially equidistant from the first first segment end of the first segment and the first third segment end of the third segment.

20. The apparatus recited in claim 19, wherein the breading return conveyor belt rotates about an axis that is substantially parallel to a first plane along which the food product is moved by the breading conveyor belt.

* * * * *